US012717929B2

(12) United States Patent
El-Moussa et al.

(10) Patent No.: US 12,717,929 B2
(45) Date of Patent: Aug. 25, 2026

(54) COMPUTER-IMPLEMENTED NETWORK SECURITY METHOD

(71) Applicant: BRITISH TELECOMMUNICATIONS PUBLIC LIMITED COMPANY, London (GB)

(72) Inventors: Fadi El-Moussa, London (GB); Behnam Azvine, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 18/844,534

(22) PCT Filed: Feb. 27, 2023

(86) PCT No.: PCT/EP2023/054793
§ 371 (c)(1),
(2) Date: Sep. 6, 2024

(87) PCT Pub. No.: WO2023/169852
PCT Pub. Date: Sep. 14, 2023

(65) Prior Publication Data

US 2025/0200190 A1 Jun. 19, 2025

(30) Foreign Application Priority Data

Mar. 10, 2022 (GB) ...................................... 2203322

(51) Int. Cl.
*H04L 29/06* (2006.01)
*G06F 21/57* (2013.01)
*H04L 9/40* (2022.01)

(52) U.S. Cl.
CPC ........ *G06F 21/577* (2013.01); *H04L 63/1408* (2013.01); *G06F 2221/034* (2013.01)

(58) Field of Classification Search
CPC .................................................... G06F 21/577
See application file for complete search history.

(56) References Cited

U.S. PATENT DOCUMENTS 9,900,324 B1 * 2/2018 Barua ................ H04L 63/1408
9,961,105 B2 5/2018 Nanda et al.
(Continued)

FOREIGN PATENT DOCUMENTS

CN 105956473 A 9/2016
DE 102020113691 A1 11/2020

OTHER PUBLICATIONS

International Search Report and Written Opinion of the ISA for PCT/EP2023/054793, mailed Apr. 24, 2023, 14 pages.
(Continued)

*Primary Examiner* — Jason K Gee
(74) *Attorney, Agent, or Firm* — Nixon & Vanderhye P.C.

(57) ABSTRACT

A computer-implemented security method comprising: generating a plurality of partial clones of a malware file, each partial clone reflecting a different aspect of the malware file; causing trial deployment of one or more security services on a software-defined network (SDN); causing each of the plurality of partial clones to be run on a respective host; causing resulting traffic to be routed over the SDN, via one or more network elements on which the security services are deployed; causing performance of each of the security services with respect to each of the plurality of partial clones to be monitored to produce a respective plurality of security service performance measures for each of the security services; and causing operational deployment of a selected one or more of the security services on a network, in dependence on the one or more pluralities of security service performance measures.

20 Claims, 3 Drawing Sheets

(56) References Cited

U.S. PATENT DOCUMENTS

| | | | | |
|---|---|---|---|---|
| 10,992,704 | B2 | 4/2021 | Ettema et al. | |
| 2017/0374028 | A1 | 12/2017 | Oliver et al. | |
| 2018/0027009 | A1* | 1/2018 | Santos | H04L 63/1441 726/25 |
| 2018/0041533 | A1 | 2/2018 | Chesla | |
| 2021/0243204 | A1 | 8/2021 | Taylor et al. | |
| 2022/0019674 | A1 | 1/2022 | Frey et al. | |
| 2022/0108025 | A1* | 4/2022 | Lo | H04L 63/1433 |
| 2022/0269817 | A1* | 8/2022 | Nalluri | H04L 63/1441 |

OTHER PUBLICATIONS

Search Report and Examination Report for GB2203322.9, dated Oct. 11, 2022, 11 pages.

International Preliminary Report on Patentability with Amended Sheets for PCT/EP2023/054793 with Amended Sheets, mailed Jan. 19, 2024, 17 pages.

Communication under Rule 71(3) EPC dated Oct. 8, 2025, issued for European Application No. 23 706 372.2 (8 pages).

* cited by examiner

COMPUTER-IMPLEMENTED NETWORK SECURITY METHOD

This application is the U.S. national phase of International Application No. PCT/EP2023/054793 filed Feb. 27, 2023, which designated the U.S. and claims priority to GB Patent Application No. 2203322.9 filed Mar. 10, 2022, the entire contents of each of which are hereby incorporated by reference.

FIELD

The present disclosure relates to network security.

More specifically, aspects relate to a computer-implemented security method, a data processing system configured to perform such a method, a computer program comprising instructions which, when the program is executed by a computer, cause the computer to carry out such a method, a computer-readable data carrier having stored thereon such a computer program, and a data carrier signal carrying such a computer program.

BACKGROUND

A number of different kinds of computer network security services are available, including:

- firewalls (FWs), which filter incoming and outgoing traffic based on e.g. traffic port and/or IP address;
- intrusion detection systems (IDs), which monitor traffic content and behaviour by inspecting traffic payloads;
- antivirus systems (AVs), which scan for and delete computer viruses; and
- uniform resource locator (URL) filters, which prevent access to malicious domains.

Different network security services are optimised for detecting and/or mitigating different types of malware behaviour. For example, a URL filtering service may be capable of preventing communication with malicious domains but may not be able to detect a malicious binary signature, while an antivirus system may be able to detect a malicious binary signature but not identify a malicious domain to which a particular piece of malware attempts to connect. The effectiveness of such security services at dealing with malicious behaviours also depends on where they are deployed in a network. In addition, different network operators and owners have different security priorities, e.g. whether traffic behaviour is more of a concern than destination server protection. Determining the best security service deployment for a particular network is therefore a complex task, and one which needs to be regularly updated to address the ways in which malware 'evolves' over time.

What is needed is an improved way of designing and updating network security service deployments.

SUMMARY

According to a first aspect, there is provided a computer-implemented security method comprising:

- generating a plurality of partial clones of a malware file, each partial clone reflecting a different aspect of the malware file;
- causing trial deployment of one or more security services on a software-defined network (SDN);
- causing each of the plurality of partial clones to be run on a respective host; causing traffic resulting from running of the plurality of partial clones on their respective hosts to be routed over the SDN, via one or more network elements on which the one or more security services are deployed;
- causing performance of each of the one or more security services with respect to each of the plurality of partial clones to be monitored to produce a respective plurality of security service performance measures for each of the one or more security services; and
- causing operational deployment of a selected one or more of the one or more security services on a network, in dependence on the one or more pluralities of security service performance measures.

The step of generating the plurality of partial clones can comprise generating two or more partial clones which each reflect a different aspect of the malware file selected from the following aspects:

- one or more destinations the malware file directs connection to;
- port behaviour of the malware file;
- traffic behaviour of the malware file;
- binary signature of the malware file; and
- privilege escalation behaviour of the malware file.

The step of generating the plurality of partial clones can comprise generating those partial clones to be modified to prevent harm; and the step of causing operational deployment of the selected one or more of the one or more security services on a network can comprise causing operational deployment of the selected one or more of the one or more security services on the SDN.

The step of causing trial deployment of the one or more security services on the SDN can comprise causing trial deployment of the one or more security services on a dedicated isolated testing SDN; and

- the step of causing operational deployment of the selected one or more of the one or more security services on the network can comprise causing operational deployment of the selected one or more of the one or more security services on a network distinct from the SDN.

The step of causing trial deployment of the one or more security services on the SDN can comprise causing two or more trial deployments of the one or more security services on the SDN, each of these two or more trial deployments comprising the one or more security services deployed on a respective SDN path in a respective configuration;

- the step of causing traffic, resulting from running of the plurality of partial clones on their respective hosts, to be routed over the SDN can comprise causing that traffic to be routed along each respective SDN path with the security services deployed in each respective configuration;
- the step of causing performance of each of the one or more security services with respect to each of the plurality of partial clones to be monitored can be further performed to produce a respective plurality of trial deployment performance measures for each of the two or more trial deployments; and
- the step of causing operational deployment of a selected one or more of the one or more security services on the network can be performed further in dependence on the two or more pluralities of trial deployment performance measures.

The computer-implemented security method can further comprise:

- causing each of the one or more security services to be assigned to a respective one of a plurality of security service type categories;

wherein:

the step of causing operational deployment of a selected one or more of the one or more security services on a network can be performed such that a respective security service of the one or more security services from each security service type category is selected for operational deployment, in dependence on the one or more pluralities of security service performance measures.

The step of causing the two or more trial deployments of the one or more security services on the SDN can comprise causing, for each of the two or more trial deployments, selection of a respective security service of the one or more security services from each security service type category for use in that trial deployment.

The step of causing performance of each of the one or more security services with respect to each of the plurality of partial clones to be monitored can be to produce a respective plurality of security service performance measures for each of the one or more security services which comprise scores with respect to ability to protect each of two or more assets.

The step of causing operational deployment of a selected one or more of the one or more security services on a network can be performed such that a respective security service of the one or more security services from each security service type category is selected for operational deployment in dependence on a weighted sum of each security service's scores with respect to ability to protect each of the two or more assets, weightings used in the weighted sums being configurable.

The step of generating the plurality of partial clones can comprise both:

generating one or more partial clones which each mimic a different aspect of the malware file; and generating one or more partial clones which each reflect a different modified version of an aspect of the malware file.

The computer-implemented security method can further comprise:

generating a further plurality of partial clones of each of one or more further malware files, each of each further plurality of partial clones reflecting a different aspect of the further malware file from which it is derived;

causing each of each further plurality of partial clones to be run on a respective host;

causing traffic resulting from running of the further plurality of partial clones on their respective hosts to be routed over the SDN, via the one or more network elements on which the one or more security services are deployed; and causing performance of each of the one or more security services with respect to each of each further plurality of partial clones to be monitored to produce a respective further plurality of security service performance measures for each of the one or more security services;

wherein:

the step of causing operational deployment of the selected one or more of the one or more security services can be performed further in dependence on the one or more further pluralities of security service performance measures.

According to a second aspect, there is provided a data processing system configured to perform the method of the first aspect.

According to a third aspect, there is provided a computer program comprising instructions which, when the program is executed by a computer, cause the computer to carry out the method of the first aspect.

According to a fourth aspect, there is provided a computer-readable data carrier having stored thereon the computer program of the third aspect.

According to a fifth aspect, there is provided a data carrier signal carrying the computer program of the third aspect.

BRIEF DESCRIPTION OF THE FIGURES

Aspects of the present disclosure will now be described by way of example with reference to the accompanying figures. In the figures.

DETAILED DESCRIPTION OF THE FIGURES

Figure 1:
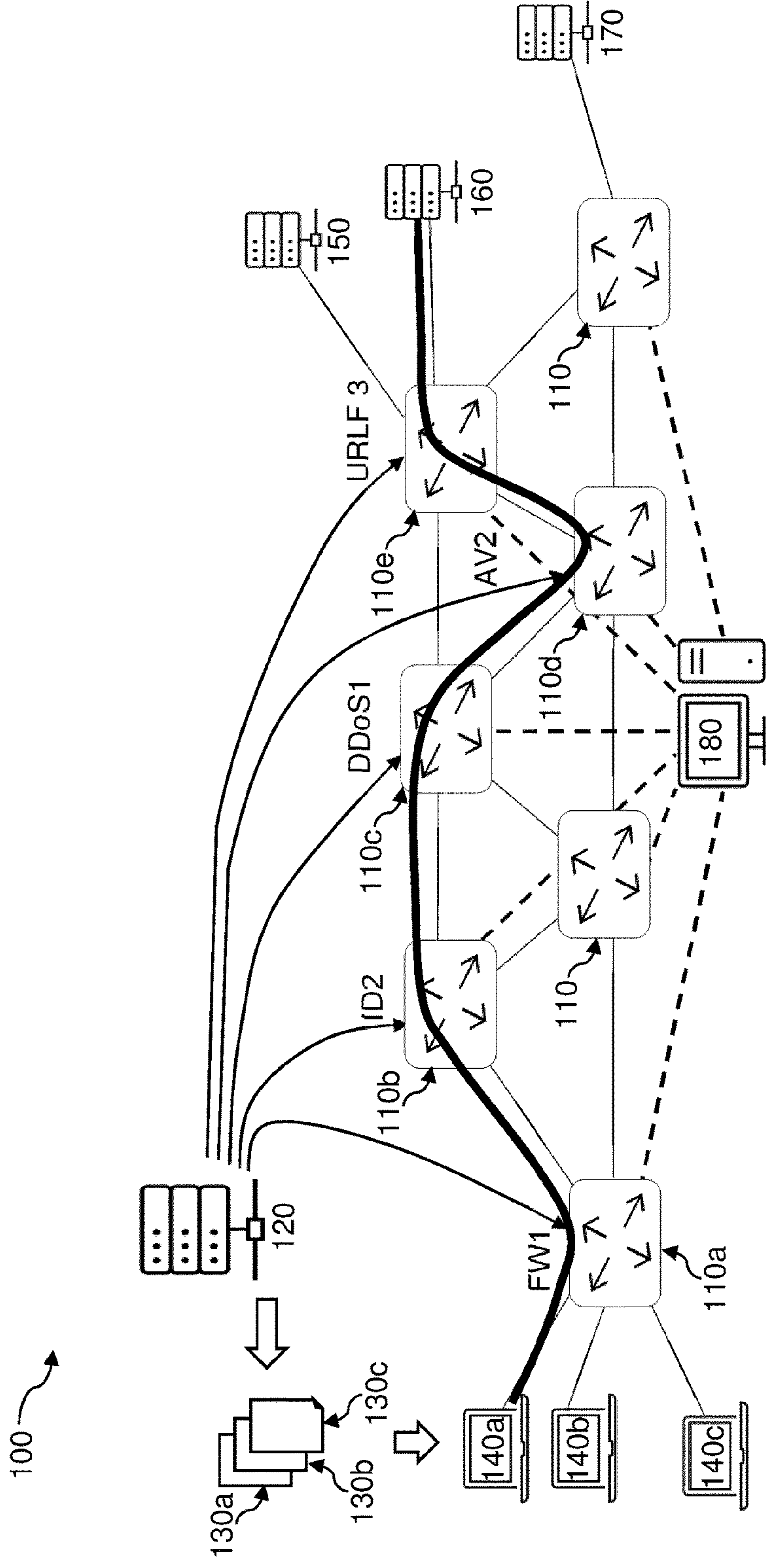
FIG. 1 schematically illustrates an example SDN.

The following description is presented to enable any person skilled in the art to make and use the system and/or perform the method of the invention, and is provided in the context of a particular application. Various modifications to the disclosed embodiments will be readily apparent to those skilled in the art.

It is proposed to deploy a set of security services on a software-defined network (SDN) and automatically evaluate their performance in respect of various aspects of known malware, for example known malware behaviour and/or known malware signatures, by running multiple 'partial clones' of a malware file on hosts connected to the SDN and routing resulting traffic via network elements on which the various security services are deployed. Each partial clone exhibits one of the malware aspects (e.g. destinations to which the malware attempts to connect, port behaviour, traffic behaviour, binary signature or privilege escalation behaviour). The SDN the evaluation is performed in can be isolated and/or the partial clones can be modified to prevent harm ('neutered'). The results of the evaluation can then be used to design network security service deployments to be used in operation of the SDN or another network the SDN mimics.

The evaluation can be repeated for multiple deployments and each deployment scored (optionally with weightings for each malware behaviour type, which can be defined by the network operator/owner) to automatically determine the best deployment.

The evaluation can also be repeated for different (types of) malware, for example representative of threats likely to be faced by the network on which the security service deployment is to be operationally deployed.

'Mutated' versions of the partial clones can also be used to evaluate deployments against likely future malware 'evolution' (e.g. a destination partial clone with added randomisation in domain generation, a traffic behaviour partial clone with modified packet size or frequency, or a privilege escalation behaviour partial clone with an additional dictionary attack).

The evaluation can be repeated, for example on a periodic basis, or in response to some kind of trigger event such as a new malware family becoming known, in order to update the operational deployment.

A set of partial clones of a malware file can be generated by analysing the malware file's 'DNA', for example as follows.

Destination partial clone

The malware file can be run in an isolated testbed, not connected to the internet, and the domains and URLs it attempts connection to can be observed by inspecting domain name system (DNS) requests and internet protocol (IP) addresses. If they appear to be random then the domain generation algorithm (DGA) being used can be extracted, for example as described in 'A machine learning framework for domain generating algorithm based malware detection', Akhila G. P., Gayathri R., Keerthana S., Angelin Gladston, 28, September 2020. A partial clone can be generated to connect to the same domains, if applicable using the same DGA. It can be neutered in the sense that it does not subsequently upload or download any data or exhibit any other malicious behaviour.

Port behaviour partial clone

The malware file can be run in an isolated testbed, not connected to the internet, and its attempts to communicate with a command and control (C&C) server observed. A partial clone can be generated to open the same set of ports, in the same sequence, to send the same type of traffic using the same protocol. It can be neutered in the sense that it does not actually attack any ports (e.g. via SQL injection).

Traffic behaviour partial clone

The malware file can be run in an isolated testbed, not connected to the internet, and the traffic it generates observed, for example using a packet capture (PCAP) application programming interface (API). The PCAP file can be used to generate a partial clone to mimic the traffic behaviour of the malware file, e.g. the protocol used, traffic frequency, length of packets, communication pattern and connection setup process. This partial clone can be neutered for example by being generated to run only the initial phases of the malware traffic behaviour (reconnaissance, setup etc.), stopping short of substantive malicious communication such as data exfiltration.

Binary signature partial clone

The binary signature partial clone can be generated by modifying the original malware binary file in such a way as to leave the malicious byte string (the signature, which may for example be capable of detection by AV) intact. It can be neutered by modifying it in such a way as to prevent it from successfully running. This can for example be achieved by reordering sections of the binary file, and/or interspersing them with random additions, and/or corrupting the import address table (IAT) in the file header which contains all the APIs the malicious binary file is intended to call.

Privilege escalation behaviour partial clone

The malware file can be run in an isolated testbed, not connected to the internet, and its privilege escalation behaviour observed, for example what type of brute force attacks are used (e.g. random or dictionary list), the interval between credential submissions, the type of commands used to attempt to gain root/admin/supervisor access (e.g. 'sudo'), any spoofed IP addresses used to connect to a destination server. A partial clone can be generated to obtain privileged access in the same way. It can be neutered by being configured to stop short of using that access for malicious purposes.

FIG. 1 illustrates an example of how such partial clones of a malware file and security services could be deployed for testing on an SDN 100. The SDN 100 comprises a plurality of network elements (e.g. switches/routers) 110 which are configurable by an SDN/network function virtualisation (NFV) controller 120.

In particular, the controller 120 can deploy security services onto the network elements 110. In the example shown the controller 120 deploys a firewall FW1 onto a network element 110*a*, an intrusion detection system ID2 onto a network element 110*b*, a distributed denial of service (DDoS) protection system DDoS1 onto a network element 110*c*, an antivirus system AV2 onto a network element 110*d* and a URL filtering system URLF 3 onto a network element 110*e*.

The controller 120 also deploys a plurality of partial clones 130*a*, 130*b*, 130*c* of a malware file (for example as described above) to be run on respective physical or virtual host systems 140*a*, 140*b*, 140*c* and configures the network elements 110 to direct resulting traffic across the SDN to one or more of a fake DNS server 150, a fake C&C server 160 and a fake victim server 170 (for brute force testing). For example, the thick black line indicates an SDN path from the host 140*a* to the C&C server 160 via each of the network elements 110*a*, 110*b*, 110*c*, 110*d* and 110*e* in turn.

A monitoring system 180 monitors performance of security services deployed on the network elements 110. The monitoring system 180 could for example be comprised in the controller 120, or could be provided separately.

Monitoring may be conducted for many different trial deployments in which the various security services to be tested are deployed on the network elements 110 of the SDN 100 in many different combinations and configurations. Testing may also be conducted using different base malware files and different sets of partial clones, perhaps including 'mutated' partial clones as described above. An appropriate balance should be struck between gathering as much test data as possible, to improve the quality of the ultimate operational deployment, and the time and other resources required to perform the testing. For example, an initial network design could be generated based on a comprehensive series of tests, then that network design and a limited number of easily implementable variants of it could be tested against a malware file representative of a newly discovered malware family as and when such discoveries are made to determine whether a threshold improvement would be achieved by modifying the network configuration to implement one of the variants.

Table 1 provides an example of monitoring results following evaluation of a set of security services in the manner described above.

TABLE 1

| | Security Service | | | | | |
|---|---|---|---|---|---|---|
| Partial Clone | FW1 | FW2 | ID1 | ID2 | AV1 | AV2 |
| Destination | No detection | 100% detection with 20% false positive rate | 50% detection | 100% detection with 40% false positive rate | Detection of cleartext only | 60% detection |

TABLE 1-continued

| | Security Service | | | | | |
|---|---|---|---|---|---|---|
| Partial Clone | FW1 | FW2 | ID1 | ID2 | AV1 | AV2 |
| Traffic Behaviour | Only protocol detected | No detection | Only packet size detected | Packet size & ports detected | Only packet frequency detected | No detection |
| Privilege Escalation Behaviour | Only spoofed IP address detected | Only spoofed IP address detected | Only login credential list detected | No detection | Only command list detected | Command list & request rate detected |

The tested security services can be scored based on these results, depending on priorities of the owner/operator/user(s) of the network to be protected. For example, if protection of a destination server is higher priority than protection of the network in general then the scores generated based on monitoring the security services' reactions to the privilege escalation behaviour partial clone can be weighted more heavily than the scores generated based on monitoring the security services' reactions to the traffic behaviour partial clone.

Figure 2:
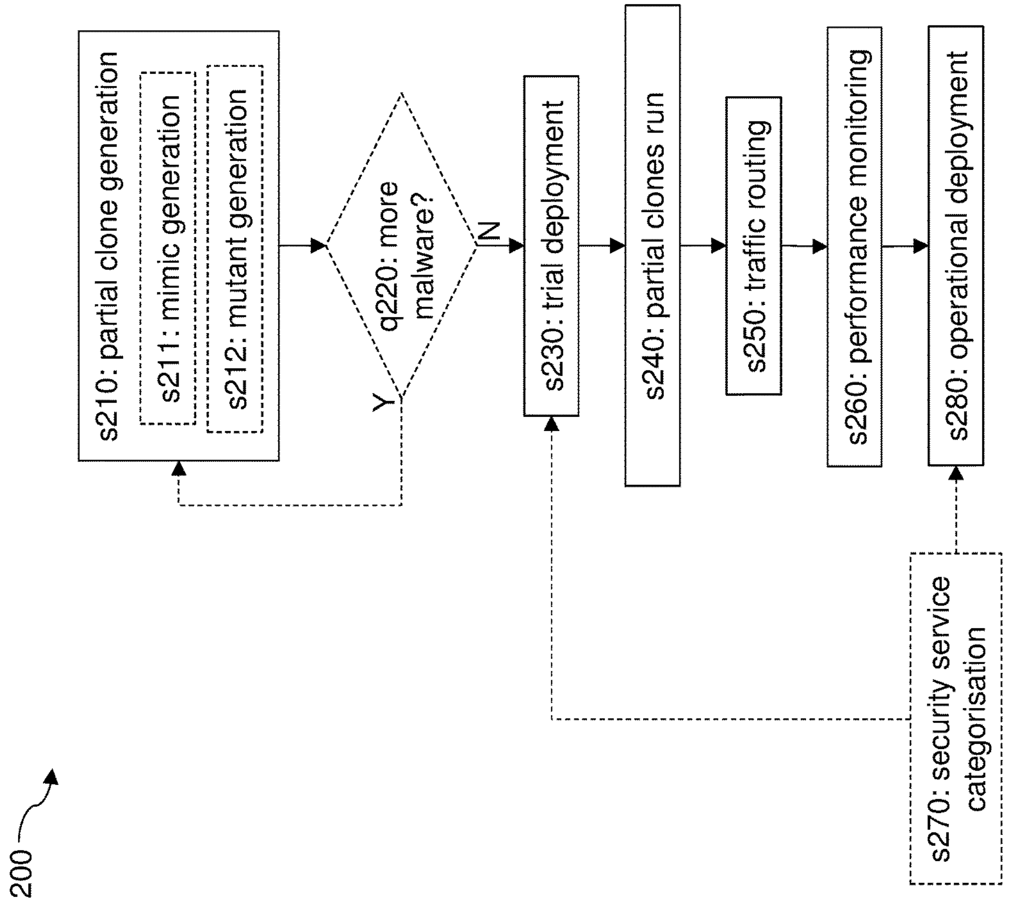
FIG. 2 illustrates an example method.

FIG. 2 is a flowchart of an example method 200 which could make use of the SDN 100 of FIG. 1. It could for example be performed by the controller 120, the monitoring system 180 or another data processing system capable of directing them.

At step s210 a plurality of partial clones of a malware file are generated, each partial clone reflecting a different aspect of the malware file. At step s230, trial deployment of one or more security services on an SDN (such as the SDN 100 of FIG. 1) is caused. At step s240 each of the plurality of partial clones is caused to be run on a respective host. (Each host can be physical or virtual. The partial clones can be run partially or wholly in parallel on different hosts, or one or more of them can be run in series on the same host.) At step s250 traffic resulting from running of the plurality of partial clones on their respective hosts is caused to be routed over the SDN, via one or more network elements on which the one or more security services are deployed. Performance of each of the one or more security services with respect to each of the plurality of partial clones is caused to be monitored at step s260, to produce a respective plurality of security service performance measures for each of the one or more security services. (For example performance measures could be whether an aspect was detected or not, the proportion of elements of an aspect detected, or a weighted sum of elements of an aspect detected.) At step s280 operational deployment of a selected one or more of the one or more security services on a network is caused, in dependence on the one or more pluralities of security service performance measures.

Step s210 of generating the plurality of partial clones can comprise generating two or more partial clones which each reflect a different aspect of the malware file selected from the following aspects:

- one or more destinations (e.g. domains and/or URLs) the malware file directs connection to;
- port behaviour of the malware file (e.g. one or more of: ports the malware file directs use of, port opening sequence the malware file directs, services the malware file directs to use particular ports, and protocols the malware file directs use of on particular ports);
- traffic behaviour of the malware file (e.g. one or more of: frequency, packet size, protocol, communication pattern and connection setup of traffic directed by the malware file);
- binary signature of the malware file; and
- privilege escalation behaviour of the malware file (e.g. one or more of: credential dictionary list type, brute force engine type, brute force credential interval, command list for root access, and spoofed IP address the malware file directs use of).

Step s210 of generating the plurality of partial clones can comprise generating those partial clones to be neutered, i.e. modified to prevent harm. In this case step s280 of causing operational deployment of the selected one or more of the one or more security services on a network can comprise causing operational deployment of the selected one or more of the one or more security services on the SDN itself.

Alternatively, if step s230 of causing trial deployment of the one or more security services on the SDN comprises causing trial deployment of the one or more security services on a dedicated isolated testing SDN, then the step s280 of causing operational deployment of the selected one or more of the one or more security services on the network can comprise causing operational deployment of the selected one or more of the one or more security services on a network distinct from the SDN. The SDN can be configured to mimic that network. In this way, the operational deployment for a network can be designed without requiring use of resources on the network itself or disrupting any ongoing operation of that network.

Since the partial clones do not need to be neutered if an isolated testing SDN is used (though they can be, for additional security), the evaluation results can in this case more accurately reflect how security services are likely to respond to unmodified malware than if neutered partial clones are used. On the other hand, using neutered partial clones for testing in the network which the operational deployment will subsequently be on means the evaluation results can more accurately reflect how security services are likely to respond in the context of that particular network.

The step s230 of causing trial deployment of the one or more security services on the SDN can comprise causing two or more trial deployments of the one or more security services on the SDN, each of these two or more trial deployments comprising the one or more security services deployed on a respective SDN path in a respective configuration. If so, the step s250 of causing traffic, resulting from running of the plurality of partial clones on their respective hosts at step s240, to be routed over the SDN can comprise causing that traffic to be routed along each respective SDN path with the security services deployed in each respective configuration. The step s260 of causing performance of each of the one or more security services with respect to each of the plurality of partial clones to be monitored can then be further performed to produce a respective plurality of trial deployment performance measures for each of the two or more trial deployments. In this way, the step s280 of causing operational deployment of a selected one or more of the one or more security services on the network can be performed further in dependence on the two or more pluralities of trial deployment performance measures so as to take into account interactions between security services in different combinations and different orders along an SDN path.

The method 200 can further comprise, at step s270, causing each of the one or more security services to be assigned to a respective one of a plurality of security service type categories (e.g. firewalls, intrusion detection systems, antivirus systems, URL filters, DDoS detectors). The step s280 of causing operational deployment of a selected one or more of the one or more security services on a network can then be performed such that a respective security service of the one or more security services from each security service type category is selected for operational deployment, in dependence on the one or more pluralities of security service performance measures. In this way, the benefits of all the different types of security services available (and in particular the example of each best suited to the particular network on which operational deployment takes place) can be incorporated into the operational deployment, without unnecessarily doubling up on functionality.

If multiple trial deployments and categorisation of security services are both implemented, then the step s230 of causing the two or more trial deployments of the one or more security services on the SDN can comprise causing, for each of the two or more trial deployments, selection of a respective security service of the one or more security services from each security service type category for use in that trial deployment.

The step s260 of causing performance of each of the one or more security services with respect to each of the plurality of partial clones to be monitored can be to produce a respective plurality of security service performance measures for each of the one or more security services which comprise scores with respect to ability to protect each of two or more assets (e.g. a network, an end server, and a local host). In this way, the operational deployment can be configured to emphasise protection of whichever asset(s) the network owner/operator/user(s) consider highest priority.

In particular, if security service categorisation per step s270 is implemented, the step s280 of causing operational deployment of a selected one or more of the one or more security services on a network can be performed such that a respective security service of the one or more security services from each security service type category is selected for operational deployment in dependence on a weighted sum of each security service's scores with respect to ability to protect each of the two or more assets, weightings used in the weighted sums being configurable.

The step s210 of generating the plurality of partial clones can comprise both generating one or more partial clones which each mimic a different aspect of the malware file at step s211, and generating one or more partial clones which each reflect a different modified version of an aspect of the malware file at step s212 (e.g. a destination partial clone with added randomisation in domain generation, a traffic behaviour partial clone with modified packet size or frequency, or a privilege escalation behaviour partial clone with an added dictionary attack). In this way, the security services can be tested both against known malware and foreseeable modifications of known malware, to provide some future-proofing of the operational deployment.

If multiple malware files are to be used to generate the partial clones at step s210 then a query q220 can be implemented following step s210 to check whether all of those malware files have been used. If so, then the method proceeds to step s230. If not, the method loops back around to step s210 which is performed in respect of another malware file, different from any it has previously been performed in respect of. In this way, step s210 can further comprise generating a further plurality of partial clones of each of one or more further malware files, each of each further plurality of partial clones reflecting a different aspect of the further malware file from which it is derived. Step s240 can then comprise causing each of each further plurality of partial clones to be run on a respective host and step s250 can comprise causing traffic resulting from running of the further plurality of partial clones on their respective hosts to be routed over the SDN, via the one or more network elements on which the one or more security services are deployed. Step s260 can further comprise causing performance of each of the one or more security services with respect to each of each further plurality of partial clones to be monitored to produce a respective further plurality of security service performance measures for each of the one or more security services. Thus, step s280 of causing operational deployment of the selected one or more of the one or more security services can be performed further in dependence on the one or more further pluralities of security service performance measures.

Suitable Data Processing System

Figure 3:
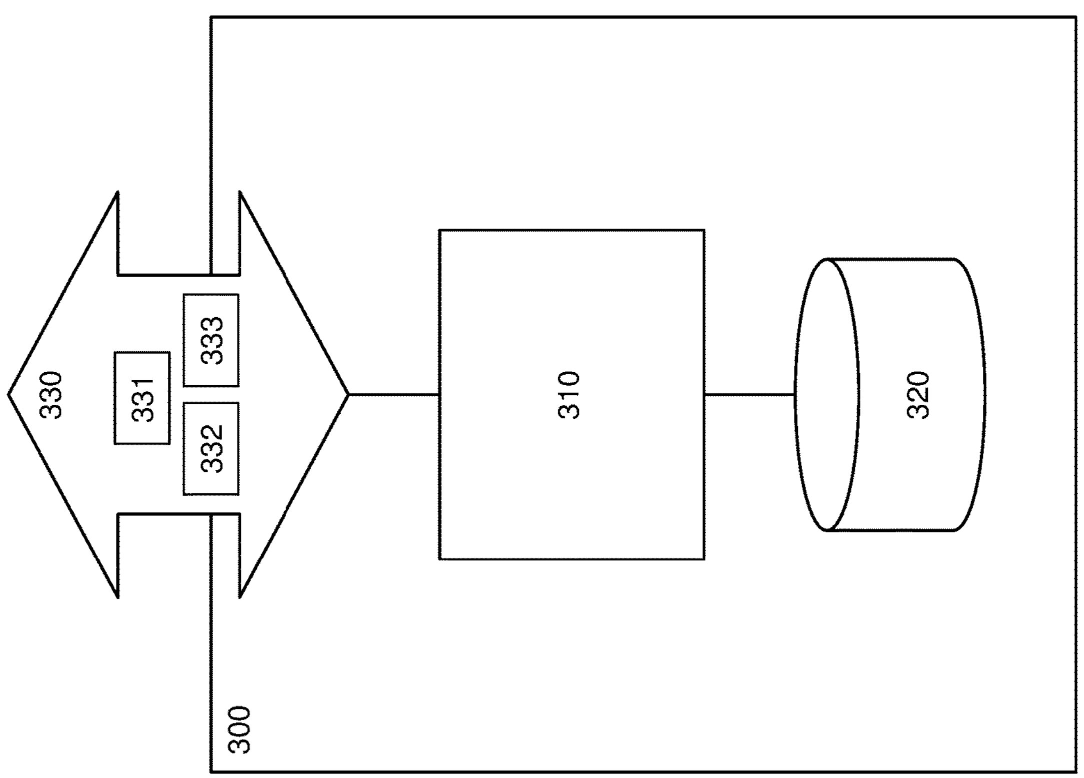
FIG. 3 schematically illustrates an example data processing system.

FIG. 3 schematically illustrates an example data processing system (DPS) 300 capable of performing the method 200 of FIG. 2. It comprises a processor 310 operably coupled to both a memory 320 and an interface (I/O) 330.

The memory 320 can optionally comprise computer program instructions which, when the program is executed by the processor 310, cause the data processing system 300 to carry out the method 200. Alternatively or additionally, the interface 330 can optionally comprise one or both of a physical interface 331 configured to receive a data carrier having such instructions stored thereon and a receiver 332 configured to receive a data carrier signal carrying such instructions.

The receiver 332, when present, can be configured to receive messages. It can comprise one or more wireless receiver modules and/or one or more wired receiver modules. The interface 330 further comprises a transmitter 333 configured to transmit messages. The transmitter 333 can comprise one or more wireless transmitter modules and/or one or more wired transmitter modules.

Interpretation Notes

Embodiments of the invention will be apparent to those skilled in the art from consideration of the specification. It is intended that the specification be considered as exemplary only.

Where this application lists one or more method steps, the presence of precursor, follow-on and intervening method steps is not excluded unless such exclusion is explicitly indicated. Similarly, where this application lists one or more components of a device or system, the presence of additional components, whether separate or intervening, is not excluded unless such exclusion is explicitly indicated.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The scope of the present invention includes any novel features or combination of features disclosed herein. The applicant hereby gives notice that new claims may be formulated to such features or combination of features during prosecution of this application or of any further applications derived therefrom. In particular, with reference to the appended claims, features from dependent claims may be combined with those of the independent claims and features from respective independent claims may be combined in any appropriate manner and not merely in the specific combinations enumerated in the claims.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. Such a computer program may be embodied as source code or undergo compilation for implementation on a processing device, apparatus or system or may be embodied as object code, for example.

Such a computer program may be encoded as executable instructions embodied in a carrier medium, non-transitory computer-readable storage device and/or a memory device in machine or device readable form, for example in volatile memory, non-volatile memory, solid-state memory, magnetic memory such as disk or tape, optically or magneto-optically readable memory such as magnetic tape, compact disk (CD), digital versatile disk (DVD) or other media that are capable of storing code and/or data. Such a computer program may alternatively or additionally be supplied from a remote source embodied in a communications medium such as an electronic signal, radio frequency carrier wave or optical carrier wave. Such carrier media are also envisaged as aspects of the present invention.

Such instructions, when executed by a processor (or one or more computers, processors, and/or other devices) may cause the processor (the one or more computers, processors, and/or other devices) to perform at least a portion of the methods described herein.

Where a processor is referred to herein, this is to be understood to refer to a single processor or multiple processors operably connected to one another. Similarly, where a memory is referred to herein, this is to be understood to refer to a single memory or multiple memories operably connected to one another.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, smartphones, tablets, network personal computers (PCs), minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

Receivers and transmitters as described herein may be standalone or may be comprised in transceivers. A communication link as described herein comprises at least one transmitter capable of transmitting data to at least one receiver over one or more wired or wireless communication channels. Wired communication channels can be arranged for electrical or optical transmission. Such a communication link can optionally further comprise one or more relaying transceivers.

The invention claimed is:

1. A computer-implemented security method comprising:

generating a plurality of partial clones of a malware file, each partial clone reflecting a different aspect of the malware file;

causing two or more trial deployments of one or more security services on a software-defined network (SDN), each of these two or more trial deployments comprising the one or more security services deployed on a respective SDN path in a respective configuration;

causing each of the plurality of partial clones to be run on a respective host;

causing traffic resulting from running of the plurality of partial clones on their respective hosts to be routed over the SDN along each respective SDN path, via one or more network elements on which the one or more security services are deployed in each respective configuration;

causing performance of each of the one or more security services with respect to each of the plurality of partial clones to be monitored to produce a respective plurality of security service performance measures for each of the one or more security services and a respective plurality of trial deployment performance measures for each of the two or more trial deployments; and causing operational deployment of a selected one or more of the one or more security services on a network, in dependence on the one or more pluralities of security service performance measures and the two or more pluralities of trial deployment performance measures.

2. The computer-implemented security method of claim 1, wherein:

the step of generating the plurality of partial clones comprises generating two or more partial clones which each reflect a different aspect of the malware file selected from the following aspects:

one or more destinations the malware file directs connection to;

port behaviour of the malware file;

traffic behaviour of the malware file;

binary signature of the malware file; and privilege escalation behaviour of the malware file.

3. The computer-implemented security method of claim 1, wherein:

the step of generating the plurality of partial clones comprises generating those partial clones to be modified to prevent harm; and the step of causing operational deployment of the selected one or more of the one or more security services on a network comprises causing operational deployment of the selected one or more of the one or more security services on the SDN.

4. The computer-implemented security method of claim 1, wherein:

the step of causing trial deployment of the one or more security services on the SDN comprises causing trial deployment of the one or more security services on a dedicated isolated testing SDN; and the step of causing operational deployment of the selected one or more of the one or more security services on the network comprises causing operational deployment of the selected one or more of the one or more security services on a network distinct from the SDN.

5. The computer-implemented security method of claim 1, further comprising:

causing each of the one or more security services to be assigned to a respective one of a plurality of security service type categories;

wherein:

the step of causing operational deployment of a selected one or more of the one or more security services on a network is performed such that a respective security service of the one or more security services from each security service type category is selected for operational deployment, in dependence on the one or more pluralities of security service performance measures.

6. The computer-implemented security method of claim 5, wherein:

the step of causing the two or more trial deployments of the one or more security services on the SDN comprises causing, for each of the two or more trial deployments, selection of a respective security service of the one or more security services from each security service type category for use in that trial deployment.

7. The computer-implemented security method of claim 1, wherein:

the step of causing performance of each of the one or more security services with respect to each of the plurality of partial clones to be monitored is to produce a respective plurality of security service performance measures for each of the one or more security services which comprise scores with respect to ability to protect each of two or more assets.

8. The computer-implemented security method of claim 7, wherein:

the step of causing operational deployment of a selected one or more of the one or more security services on a network is performed such that a respective security service of the one or more security services from each security service type category is selected for operational deployment in dependence on a weighted sum of each security service's scores with respect to ability to protect each of the two or more assets, weightings used in the weighted sums being configurable.

9. The computer-implemented security method of claim 1, wherein the step of generating the plurality of partial clones comprises both:

generating one or more partial clones which each mimic a different aspect of the malware file; and generating one or more partial clones which each reflect a different modified version of an aspect of the malware file.

10. The computer-implemented security method of claim 1, further comprising:

generating a further plurality of partial clones of each of one or more further malware files, each of each further plurality of partial clones reflecting a different aspect of the further malware file from which it is derived;

causing each of each further plurality of partial clones to be run on a respective host;

causing traffic resulting from running of the further plurality of partial clones on their respective hosts to be routed over the SDN, via the one or more network elements on which the one or more security services are deployed; and causing performance of each of the one or more security services with respect to each of each further plurality of partial clones to be monitored to produce a respective further plurality of security service performance measures for each of the one or more security services;

wherein:

the step of causing operational deployment of the selected one or more of the one or more security services is performed further in dependence on the one or more further pluralities of security service performance measures.

11. A data processing system comprising: at least one processor and a memory coupled to the at least one processor and storing a computer program for execution by the at least one processor to cause the data processing system to at least be configured to:

generate a plurality of partial clones of a malware file, each partial clone reflecting a different aspect of the malware file;

cause two or more trial deployments of one or more security services on a software-defined network (SDN), each of these two or more trial deployments comprising the one or more security services deployed on a respective SDN path in a respective configuration;

cause each of the plurality of partial clones to be run on a respective host;

cause traffic resulting from running of the plurality of partial clones on their respective hosts to be routed over the SDN along each respective SDN path, via one or more network elements on which the one or more security services are deployed in each respective configuration;

cause performance of each of the one or more security services with respect to each of the plurality of partial clones to be monitored to produce a respective plurality of security service performance measures for each of the one or more security services and a respective plurality of trial deployment performance measures for each of the two or more trial deployments; and cause operational deployment of a selected one or more of the one or more security services on a network, in dependence on the one or more pluralities of security service performance measures and the two or more pluralities of trial deployment performance measures.

12. The data processing system of claim 11, wherein to generate the plurality of partial clones, the data processing system is further configured to:

generate two or more partial clones which each reflect a different aspect of the malware file selected from the following aspects:

one or more destinations the malware file directs connection to;

port behaviour of the malware file;

traffic behaviour of the malware file;

binary signature of the malware file; and privilege escalation behaviour of the malware file.

13. The data processing system of claim 11, wherein:

to generate the plurality of partial clones, the data processing system is further configured to generate those partial clones to be modified to prevent harm; and to cause operational deployment of the selected one or more of the one or more security services on the network, the data processing system is further configured to cause operational deployment of the selected one or more of the one or more security services on the SDN.

14. The data processing system of claim 11, wherein:

to cause trial deployment of the one or more security services on the SDN, the data processing system is further configured to cause trial deployment of the one or more security services on a dedicated isolated testing SDN; and to cause operational deployment of the selected one or more of the one or more security services on the network, the data processing system is further configured to cause operational deployment of the selected one or more of the one or more security services on a network distinct from the SDN.

15. The data processing system of claim 11, wherein the data processing system is further configured to:

cause each of the one or more security services to be assigned to a respective one of a plurality of security service type categories;

wherein:

the causing of operational deployment of the selected one or more of the one or more security services on the network is performed such that a respective security service of the one or more security services from each security service type category is selected for operational deployment, in dependence on the one or more pluralities of security service performance measures; and to cause the two or more trial deployments of the one or more security services on the SDN, the data processing system is further configured to cause, for each of the two or more trial deployments, selection of a respective security service of the one or more security services from each security service type category for use in that trial deployment.

16. The data processing system of claim 11, wherein:

to cause performance of each of the one or more security services with respect to each of the plurality of partial clones to be monitored, the data processing system is further configured to produce a respective plurality of security service performance measures for each of the one or more security services which comprise scores with respect to ability to protect each of two or more assets.

17. The data processing system of claim 16, wherein:

the causing of the operational deployment of the selected one or more of the one or more security services on the network is performed such that a respective security service of the one or more security services from each security service type category is selected for operational deployment in dependence on a weighted sum of each security service's scores with respect to ability to protect each of the two or more assets, weightings used in the weighted sums being configurable.

18. The data processing system of claim 11, wherein:

wherein to generate the plurality of partial clones, the data processing system is further configured to both:

generate one or more partial clones which each mimic a different aspect of the malware file; and generate one or more partial clones which each reflect a different modified version of an aspect of the malware file.

19. The data processing system of claim 11, wherein the data processing system is further configured to:

generate a further plurality of partial clones of each of one or more further malware files, each of each further plurality of partial clones reflecting a different aspect of the further malware file from which it is derived;

cause each of each further plurality of partial clones to be run on a respective host;

cause traffic resulting from running of the further plurality of partial clones on their respective hosts to be routed over the SDN, via the one or more network elements on which the one or more security services are deployed; and cause performance of each of the one or more security services with respect to each of each further plurality of partial clones to be monitored to produce a respective further plurality of security service performance measures for each of the one or more security services;

wherein:

the causing of the operational deployment of the selected one or more of the one or more security services is performed further in dependence on the one or more further pluralities of security service performance measures.

20. A non-transitory computer-readable storage medium storing a computer program comprising instructions which, when the program is executed by a computer, cause the computer to carry out the method of claim 1.

* * * * *